(No Model.)
C. J. HAUCK, Jr.
STRAINER.
No. 419,520. Patented Jan. 14, 1890.
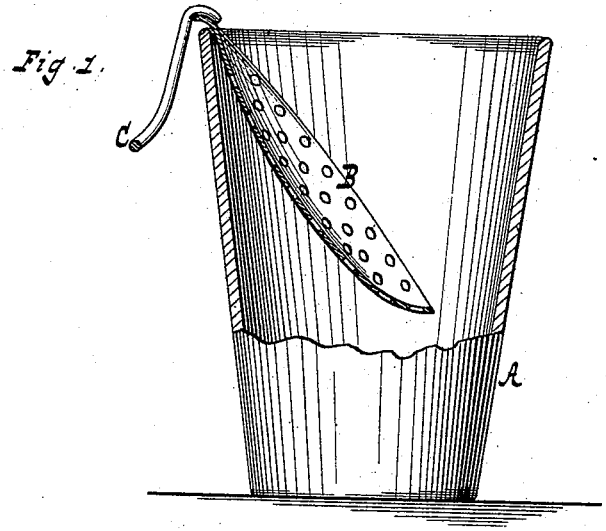
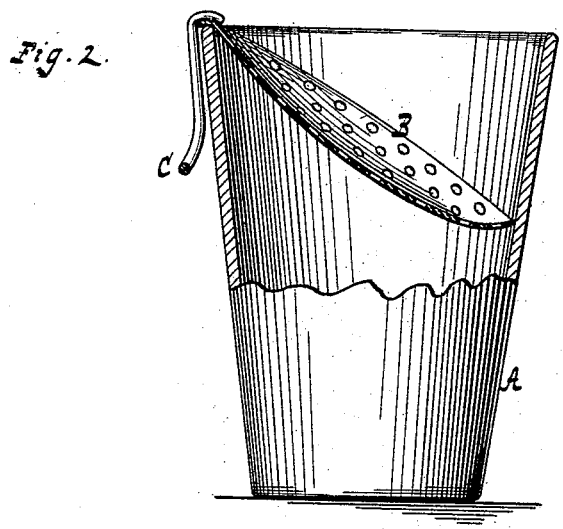
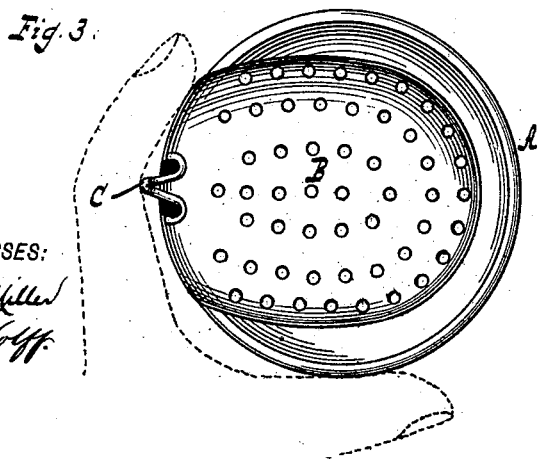
WITNESSES:
William Miller
Edward Wolff
INVENTOR:
Charles J. Hauck Jr.
BY
Van Santvoord & Hauff,
ATTORNEYS

UNITED STATES PATENT OFFICE.

CHARLES J. HAUCK, JR., OF BROOKLYN, NEW YORK.

STRAINER.

SPECIFICATION forming part of Letters Patent No. 419,520, dated January 14, 1890.

Application filed July 31, 1889. Serial No. 319,338. (No model.)

*To all whom it may concern:*

Be it known that I, CHARLES J. HAUCK, Jr., a citizen of the United States, residing at Brooklyn, in the county of Kings and State of New York, have invented new and useful Improvements in Strainers, of which the following is a specification.

My invention relates to certain improvements in liquid-strainers, and the purpose thereof is to provide a novel and simple device readily attachable to and detachable from a tumbler or other vessel, and having such form that while supported upon the edge of such vessel it may be thrown obliquely across the whole interior thereof or dropped to partly close or cover the interior, as may be desired, to enable the liquid contents of the vessel to be strained and separated from the solids, or to be imbibed from said vessel without bringing the strainer in contact with any feature of the person drinking.

The invention consists in the novel details of construction, hereinafter fully set forth, and then definitely pointed out in the claims following this specification.

Referring to the accompanying drawings, Figure 1 is a sectional view showing a strainer constructed in accordance with my invention, resting loosely upon the edge of a tumbler or other vessel. Fig. 2 is a similar view showing the strainer thrown entirely across the interior of the vessel. Fig. 3 is a plan view of the parts shown in Fig. 1.

In the said drawings, the reference-letter A designates a vessel—such, for example, as a tumbler—and the letter B denotes the strainer. The latter is formed of a plate of metal of substantially oval contour, and to its body portion a spoon-shaped or concavo-convex form is given by any suitable means. This spoon-shaped portion presents its concave face upward or next to the open top of the vessel in which the strainer is placed, and it is perforated with numerous openings to permit the free passage of the liquid contents of the vessel.

Upon the supporting end of the strainer, or that end which rests upon the edge of the vessel, is formed or mounted a flange $a$, having substantially a crescent shape and inclined as to the strainer at an angle of about forty-five degrees. This flange forms a base of support for the strainer, and when resting flat upon the edge of the vessel, as shown in Fig. 2, the perforated body portion B will cross the interior obliquely and practically occupy the entire space inclosed by the wall of the vessel. Upon the central portion of the flange $a$ is formed or mounted a rigid handle C, which is bent at an angle to the flange and to the body of the strainer, whereby it normally hangs outside the vessel A at an angle with its wall, as shown in Fig. 1. By placing the finger upon this handle in lifting the vessel it is drawn close to the vessel, as shown in Fig. 2, and the strainer is brought obliquely across the interior, as shown in said figure and already described.

By the construction set forth the strainer lies wholly within the tumbler or vessel, or practically so, while at the same time it wholly covers the solid contents of the vessel, confining them within the same so entirely as to permit the tumbler to be inverted without losing or disturbing any portion of the ice or other solids. The liquid contents of the vessel may be either strained off or imbibed directly therefrom without any danger of the nose, lips, or mustache coming in contact with the strainer, and, if desired, the latter may be depressed to the position shown in Fig. 1, to agitate the solid contents of the vessel or to exert pressure thereon to fully expel the liquids therefrom.

The vessel is held and the strainer confined in place by one hand, leaving the other free.

Heretofore, and prior to my invention, a circular strainer has been used, lying across the open mouth of the vessel and having spring-hooks at intervals on its periphery to engage the edge of the glass. A substantially heart-shaped strainer has also been used having spring-hooks projecting from its opposite edges and hooking over the rim of the vessel. In this construction the strainer does not confine the entire solid contents of the vessel within its interior, nor can it be made to do so, and in consequence it is impossible to invert the glass or even partially invert it without spilling more or less of the ice and other solids. Moreover, the strainer is immovable after it is once adjusted, and a considerable portion of its body projects above the open top of the vessel, rendering it necessary to cut away a considerable central part thereof to permit the nose to pass when drinking.

I make no claim to either of the constructions alluded to.

What I claim is—

1. A strainer consisting of a substantially oval perforated body, having at one end a flange adapted to rest upon the edge or rim of a vessel and provided with a handle forming an angle with the body of the strainer, whereby the latter may be thrown across the whole interior of the vessel or depressed to partly cross the same, substantially as described.

2. A strainer consisting of a substantially oval perforated body portion of spoon shape or concavo-convex and provided upon its end with a flat crescent-shaped flange forming an angle with the body portion, said flange having a rigid central handle which normally hangs, when the flange rests upon the rim of a vessel, at an angle with the wall of said vessel, and is adapted to be confined by the hand or finger against said wall to throw the strainer obliquely across the whole interior of the vessel, substantially as described.

In testimony whereof I have hereunto set my hand in the presence of two subscribing witnesses.

CHAS. J. HAUCK, JR.

Witnesses:
WM. C. HAUFF,
E. F. KASTENHUBER.